US010453076B2

(12) United States Patent
Parekh et al.

(10) Patent No.: US 10,453,076 B2
(45) Date of Patent: Oct. 22, 2019

(54) COLD STORAGE FOR LEGAL HOLD DATA

(71) Applicant: Facebook, Inc., Menlo Park, CA (US)

(72) Inventors: Ronak Rajesh Parekh, Los Altos, CA (US); Ryan W. Wagner, Sunnyvale, CA (US); Delia David, Mountain View, CA (US); Sepehr Merat, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 609 days.

(21) Appl. No.: 15/171,293

(22) Filed: Jun. 2, 2016

(65) Prior Publication Data

US 2017/0352038 A1    Dec. 7, 2017

(51) Int. Cl.
*G06F 16/00*    (2019.01)
*G06Q 30/00*    (2012.01)
*G06F 16/21*    (2019.01)
*G06F 16/28*    (2019.01)

(52) U.S. Cl.
CPC ........... *G06Q 30/018* (2013.01); *G06F 16/21* (2019.01); *G06F 16/283* (2019.01)

(58) Field of Classification Search
CPC ............ G06Q 30/018; G06F 17/30289; G06F 17/30592; G06F 16/283; G06F 16/21
See application file for complete search history.

(56) References Cited

U.S. PATENT DOCUMENTS

| 5,247,660 | A  | * | 9/1993  | Ashcraft ............... G06F 3/0601 |
| 5,495,457 | A  | * | 2/1996  | Takagi ................. G11B 17/228 369/30.03 |
| 8,140,786 | B2 |   | 3/2012  | Bunte et al. |
| 8,972,354 | B1 | * | 3/2015  | Telang .................. G06Q 10/10 707/653 |
| 9,323,615 | B2 |   | 4/2016  | Cypher et al. |
| 9,483,200 | B2 |   | 11/2016 | Coglitore et al. |
| 9,733,850 | B2 |   | 8/2017  | Coglitore et al. |
| 2003/0023826 | A1 | * | 1/2003 | McMichael ........... G06F 3/0601 711/173 |
| 2008/0034224 | A1 | * | 2/2008 | Ferren ..................... G06F 21/88 713/193 |
| 2008/0198706 | A1 | * | 8/2008 | Wu ........................ G06F 3/0605 369/30.23 |
| 2008/0222480 | A1 |   | 9/2008 | Huang et al. |

(Continued)

OTHER PUBLICATIONS

Notice of Allowance dated Jun. 20, 2017, for U.S. Appl. No. 15/281,691 by Coglitore, G., et al. filed Sep. 30, 2016.

(Continued)

*Primary Examiner* — Alexander Khong
(74) *Attorney, Agent, or Firm* — FisherBroyles, LLP

(57) ABSTRACT

Embodiments are disclosed for preserving legal hold data using a code storage system (e.g., an array of Blu-ray discs). A method according to some embodiments includes receiving a notice that a data retention period has expired for a database table stored in a data warehouse, identifying that the database table is labeled as legal hold data, transferring the database table to a cold storage device that includes an array of digital optical discs in response to the identification of legal hold data, and labeling the database table stored in the cold storage device as legal hold data and preventing removal or modification of the database table labeled as legal hold data.

20 Claims, 6 Drawing Sheets

(56) References Cited

U.S. PATENT DOCUMENTS

| | | | | |
|---|---|---|---|---|
| 2008/0279085 A1* | 11/2008 | Yashima | ............ | G11B 7/00736 369/275.3 |
| 2008/0319909 A1* | 12/2008 | Perkins | ................. | G06Q 10/00 705/50 |
| 2009/0092025 A1* | 4/2009 | Chuang | ................ | G11B 7/0055 369/100 |
| 2009/0129250 A1* | 5/2009 | Katata | ................. | G11B 27/329 369/275.3 |
| 2009/0150431 A1* | 6/2009 | Schmidt | ............ | G06F 17/30595 |
| 2009/0150866 A1* | 6/2009 | Schmidt | ................ | G06Q 50/18 717/120 |
| 2010/0129066 A1* | 5/2010 | Maeda | ................. | G11B 27/329 386/334 |
| 2011/0182155 A1* | 7/2011 | Heitlinger | ............ | G11B 27/002 369/30.26 |
| 2011/0320494 A1* | 12/2011 | Fisher | ............... | G06F 17/30011 707/780 |
| 2012/0047112 A1* | 2/2012 | Steffan | .............. | G06F 17/30011 707/662 |
| 2012/0246425 A1* | 9/2012 | Tanaka | ................. | G06F 3/0611 711/162 |
| 2012/0290878 A1 | 11/2012 | Gladwin et al. | | |
| 2013/0275429 A1* | 10/2013 | York | ................ | G06F 17/30029 707/737 |
| 2013/0346365 A1* | 12/2013 | Kan | ........................ | G06F 3/061 707/610 |
| 2014/0052689 A1* | 2/2014 | Ficara | ............... | G06F 17/30174 707/610 |
| 2014/0278647 A1* | 9/2014 | Rameshkumar | ..... | G06Q 10/105 705/7.15 |
| 2014/0286150 A1* | 9/2014 | Miura | ................ | G11B 7/24097 369/53.2 |
| 2016/0098573 A1* | 4/2016 | Yankovskiy | ...... | G06F 17/30203 726/27 |
| 2016/0124677 A1 | 5/2016 | Coglitore et al. | | |
| 2016/0224672 A1* | 8/2016 | Bindal | ................ | G06F 16/9535 |
| 2017/0017427 A1 | 1/2017 | Coglitore | | |
| 2017/0039227 A1* | 2/2017 | Herbst | .............. | G06F 17/30336 |

OTHER PUBLICATIONS

Corrected Notice of Allowability dated Aug. 25, 2016, for U.S. Appl. No. 14/531,312 by Coglitore, G., et al. filed Nov. 3, 2014.
Notice of Allowance dated Jul. 29, 2016, for U.S. Appl. No. 14/531,312 by Coglitore, G., et al. filed Nov. 3, 2014.
U.S. Appl. No. 15/281,691 by Coglitore, G., et al. filed Sep. 30, 2016.
Non-Final Office Action dated Oct. 21, 2016, for U.S. Appl. No. 15/281,691 by Coglitore, G., et al. filed Sep. 30, 2016.
Non-Final Office Action dated Jan. 12, 2016, for U.S. Appl. No. 14/531,312 by Coglitore, G., et al. filed Nov. 3, 2014.
U.S. Appl. No. 14/531,312 by Coglitore, G., et al. filed Nov. 3, 2014.
Corrected Notice of Allowability dated Jul. 13, 2017 of U.S. Appl. No. 15/281,691 by Coglitore, G., et al., filed Sep. 30, 2016.

* cited by examiner

COLD STORAGE FOR LEGAL HOLD DATA

BACKGROUND

The volume of data stored by organizations is thought to be growing geometrically. By some estimates, the digital data generated in a year exceeds the volume digital data generated in all previous years since digital data first began being generated. However, some of this data is rarely, if ever, accessed. Nevertheless, this data must remain accessible, e.g., for legal reasons. This rarely accessed data can be classified as "cold data." Cold data is increasingly stored in cost-efficient storage systems ("cold data storage systems").

Cold data storage has become an important market segment in the data storage field. The capacity of cold data storage systems is increasing. "Big data technology," which is developing at a fast pace, requires a tremendous amount of cheap and massive storage space. It is predicted that by the year 2018, the total amount of data for the entire human world will reach a size of 44 zettabytes (ZB; 1 ZB=1 million petabytes (PB)). However, not all data will be stored and preserved at the same level of access. For example, the majority of the data being processed by the big data technology will be stored in the cold data storage, which is not immediately available to the processing system of the big data technology.

Organizations typically have various data retention policies. Most policies require data to be permanently deleted after expiry of various time periods. However, the data sometimes must be held longer and deleting it early may cause the organizations to incur various liability, e.g., because of "legal holds." A legal hold order sometimes occur by order of a court of law, e.g., during a litigation. Organizations thus must take various precautions to ensure that they comply with both data retention policies and legal hold requirements.

DETAILED DESCRIPTION

The disclosed embodiments are directed to maintaining legal hold data in a cold storage device, e.g., by utilizing Blu-ray technology. Data in a data warehouse (e.g., a data storage system) is organized as homogeneous units having common schema. The homogenous units are referred to as tables. The data that is subject to a data retention period in the disclosed embodiments are stored in a table. After the data retention period expires, a data scrubbing service deletes the table from the data warehouse. To avoid deletion because of a legal hold, the pertinent tables can be tagged as storing data subject to a legal hold. If a particular table is tagged as storing data subject to a legal hold ("legal hold data"), the table is transferred to a cold storage device, e.g., a device that uses a large array of Blu-ray discs.

Each Blu-ray disc is partitioned into multiple volumes. In some embodiments, a volume can store up to one TB of data. A volume manager assigns an initial volume for storing the table. If the table size exceeds the size of the initial volume, the volume manager assigns an additional volume for storing data of the table. The volume manager attempts to assign additional volumes for a particular application or client on the same disc as the initial volume, e.g., to improve the data access efficiency. If there is no volume available on the disc, the volume manager will assign a volume of another disc. Data that is stored to volumes can be encrypted with an encryption key.

An authorized client/user can retrieve the legal hold data from the cold storage device. The legal hold data stored on the cold storage device cannot be modified or deleted. Once a table is no longer on legal hold, the data of the table can be eliminated by destroying the encryption key that was used to encrypt the table data being stored on the Blu-ray discs. Because the encryption key is required to unencrypt the previously encrypted data, the data is permanently made inaccessible by deleting the encryption key. The cold storage device can further corrupt the data by physically damaging the sectors on the Blu-ray discs that store the corresponding data.

Figure 1:
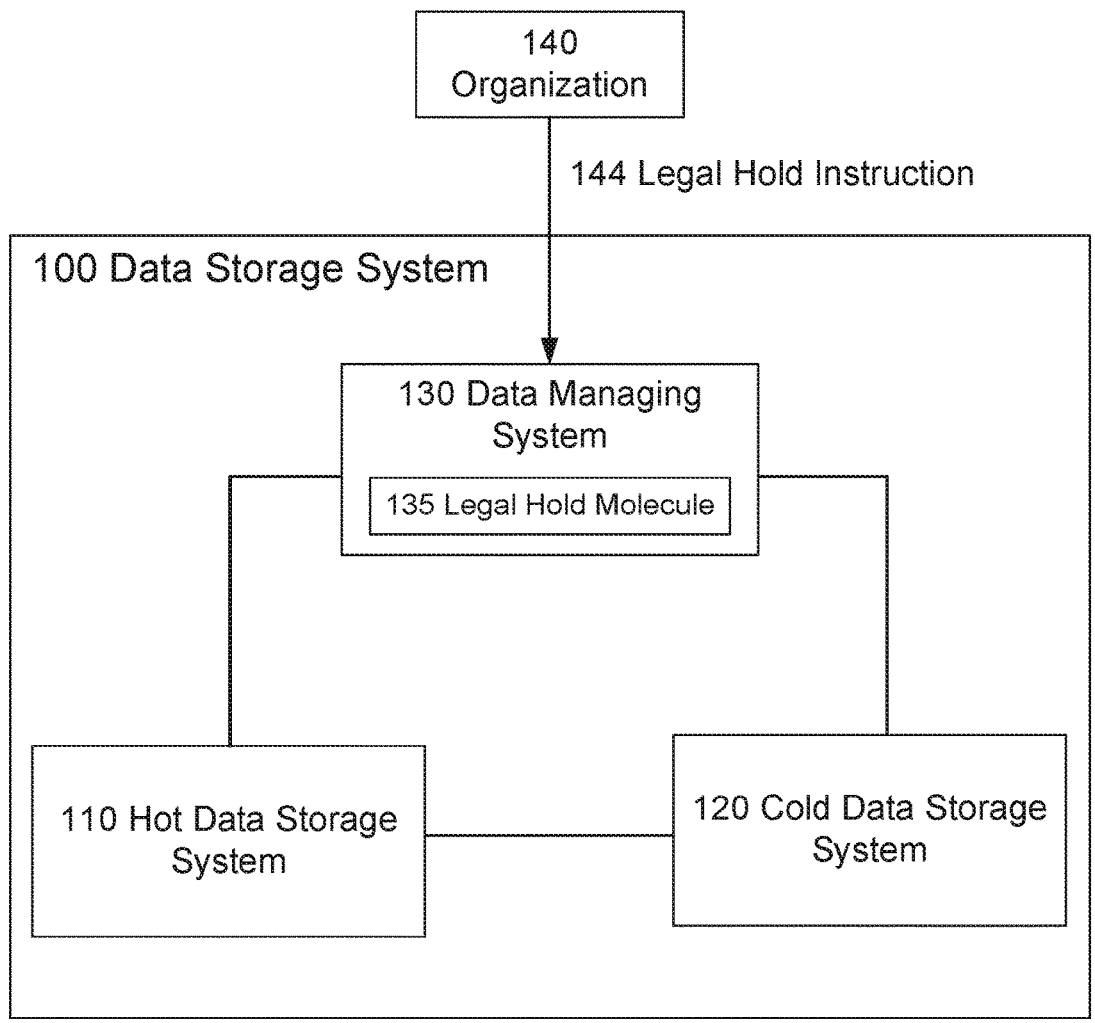
FIG. 1 is a block diagram illustrating a data storage system for preserving legal hold data.

FIG. 1 is a block diagram illustrating a data storage system for preserving legal hold data. In some embodiments, a data storage system 100 includes a hot data storage system 110, a cold data storage system 120 and a data managing system 130. The data managing system 130 divides the data stored by the data storage system 100 based on the access frequency of the data and the access speed of the data storage mechanism. The combined requirement of the access frequency and the access speed can be referred to as "data temperature." If a data set is frequently accessed and required to be stored on a fast-access data storage mechanism, the data managing system identifies the data set as "hot data" and instructs the hot data storage system 110 (also referred to as the data warehouse) to store the hot data set. In contrast, if a data set is rarely accessed and can be stored on a slow-access data storage mechanism without significant impact to the party that needs to access the data set, the data managing system identifies the data set as "cold data" and instructs the cold data storage system 120 to store the cold data set.

Although having a slower access speed, the cost of building and maintaining the cold data storage system 120 is cheaper compared to the hot data storage system 110, in terms of cost per data storage unit. By splitting the data into two levels of data storage mechanisms based on the access frequency and data access speed, the data storage system 100 provides a data storage solution having an optimal balance between the performance and the cost.

In some embodiments, the data managing system 130 can use various key performance indicators (KPIs) to predict the data access frequency and hence determine the data temperature based on operational and business decisions involving the data. For example, the data managing system 130 can, e.g., assume the data frequency based on the age of the data. Likely one-year-old data is less frequently accessed than data that is 30 days old. The data managing system 130 can identify data that is older than a certain threshold (e.g., after a data retention period) and will be less frequently accessed as cold data, and stores the cold data in the cold data storage system 120 accordingly.

The data managing system 130 can include a legal hold module 135 responsible for enforcing legal hold policy on the data storage system 100. During a legal hold process, an organization (e.g., a corporation) 140 that owns the data sends a legal hold instruction 145 to the data managing system 130 of the data storage system 100, in anticipation of litigation. The legal hold instruction 145 informs the data managing system 130 to preserve all data that are relevant to the anticipated litigation (or ongoing litigation).

A legal hold can be, e.g., initiated by a notice from a legal counsel to the organization 140 to suspend the normal disposition process of data records. For example, the civil litigation rules (e.g., United States Federal Rules of Civil Procedure) can require a party to preserve both paper and electronic documents that are relevant to an anticipated or current litigation until the legal matter is formally settled, even if the organization 140 just reasonably anticipates the litigation. The organization 140 can issue a legal hold to suppress normal disposition process as a result of current or anticipated litigation, audit, or government investigation for the purpose of avoiding evidence spoliation. Such normal disposition process can include, e.g., recycling or destroying the data storage media.

During an initial stage for enforcing the legal hold policy (referred to as "culling" stage), the data managing system 130 identifies and preserves the needed data out of a set of potentially relevant data. The data managing system 130 then preserves the identified data in a physical data repository (e.g., the cold data storage system 120) for storing all data subject to the legal hold. The data managing system 130 utilizes a highly policy-based approach that enables archived and current data to be categorized and tagged according to the relevance to the legal hold policy of the organization 140. Due to the risks associated with deleting or losing access to the legal hold data, the data managing system 130 can use a segregated data repository (e.g., a segregated cold data storage system 120) to handle the unique retention requirements and access needs of the legal hold data.

As illustrated in FIG. 1, the legal hold module 135 processes the legal hold instruction 145 and extracts metadata from the legal hold instruction 145. The metadata can include information about the potential or ongoing litigation that invokes the legal hold process. The legal hold module 135 then compares the extracted metadata with the metadata associated with the data that is stored in the data storage system 100 and that is owned by the an organization 140, in order to identify legal hold data. If the legal hold module 135 identifies legal hold data as relevant to the potential or ongoing litigation, the data managing system 130 instructs the cold data storage system 120 to store the identified data and mark them as legal hold data (e.g., via a metadata flag) to avoid accidental deletion or modification.

In some embodiments, the data stored in the data storage system 100 can be organized as database tables. For example, the data can include information of a social networking system, and the data can be organized as tables of a data warehouse (e.g., Apache Hive tables). The data warehouse (e.g., the hot data storage system 110) can be built on top of, e.g., a distributed storage and processing system on computer clusters (e.g., Apache Hadoop). The data warehouse provides data summarization, query and analysis of data of the database tables. In some embodiments, the data warehouse can provide a structured query language interface for managing the table data. Through the interface, the data storage system 100 can reach and transparently converts data queries to various types of data processing jobs including, e.g., map-reduce jobs. To accelerate data access queries, the data warehouse can provides indexes including, e.g., bitmap indexes.

Figure 2:
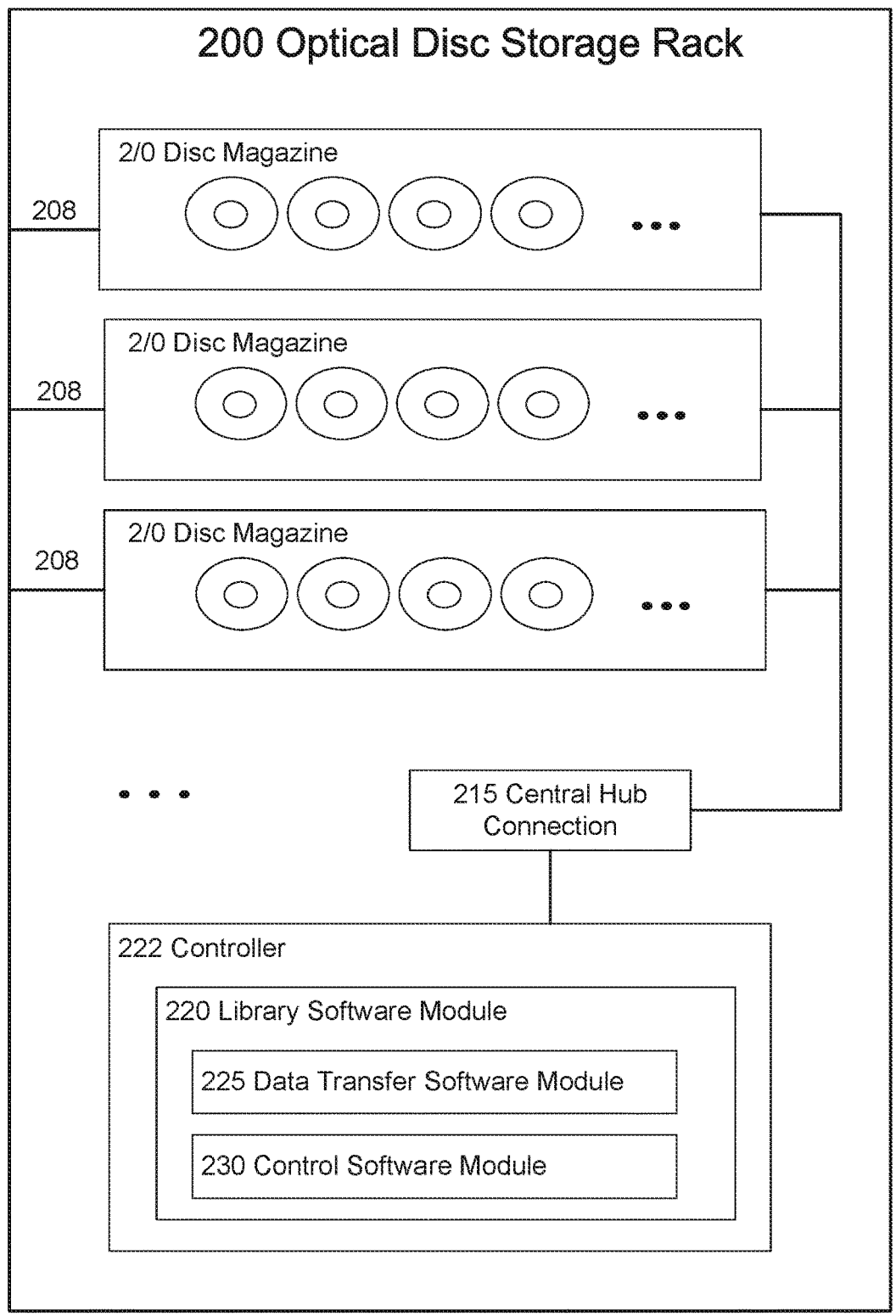
FIG. 2 is a block diagram illustrating an optical disc storage rack that stores multiple optical discs for cold data storage.

In order to provide a massive amount of cold storage space for a relatively low cost, the cold data storage system 120 can include one or more optical disc storage racks. The racks store an array of digital optical discs for providing cold storage of the database tables. FIG. 2 is a block diagram illustrating an optical disc storage rack that stores multiple optical discs for cold data storage. The optical disc storage rack 200 includes multiple disc magazines 210. The disc magazines 210 can be attached to sliding mechanisms 208 that enable easy insertion and removal of the disc magazines 210. Each disc magazine 210 includes multiple digital optical discs (e.g., Blu-ray discs) for providing cold storage space. To expand a total storage capacity of the optical disc storage rack 200, more disc magazines 210 can be added to the optical disc storage rack 200 by inserting them via the sliding mechanisms 208.

The disc magazines 210 allow data transfer to and from via a library software module 220 via a central hub connection 215. The library software module 220 controls the data flow from each disc magazine 210 and provides configuration functionality. The library software module 220 can be stored onboard a controller 222 of the optical disc storage rack 200. The library software module 220 can include, e.g., a data transfer software module 225 and a control software module 230. The data transfer software module 225 is responsible for controlling the data transferring from and to the optical discs in the disc magazines 210. The control software module 230 is responsible for controlling the overall operation of the optical disc storage rack 200 and operating a disc picker mechanism (not shown in FIG. 2). The disc picker mechanism retrieves an optical disc from one of the disc magazines 210 and enables the data transfer software module 225 to read data from the optical disc.

Figure 3:
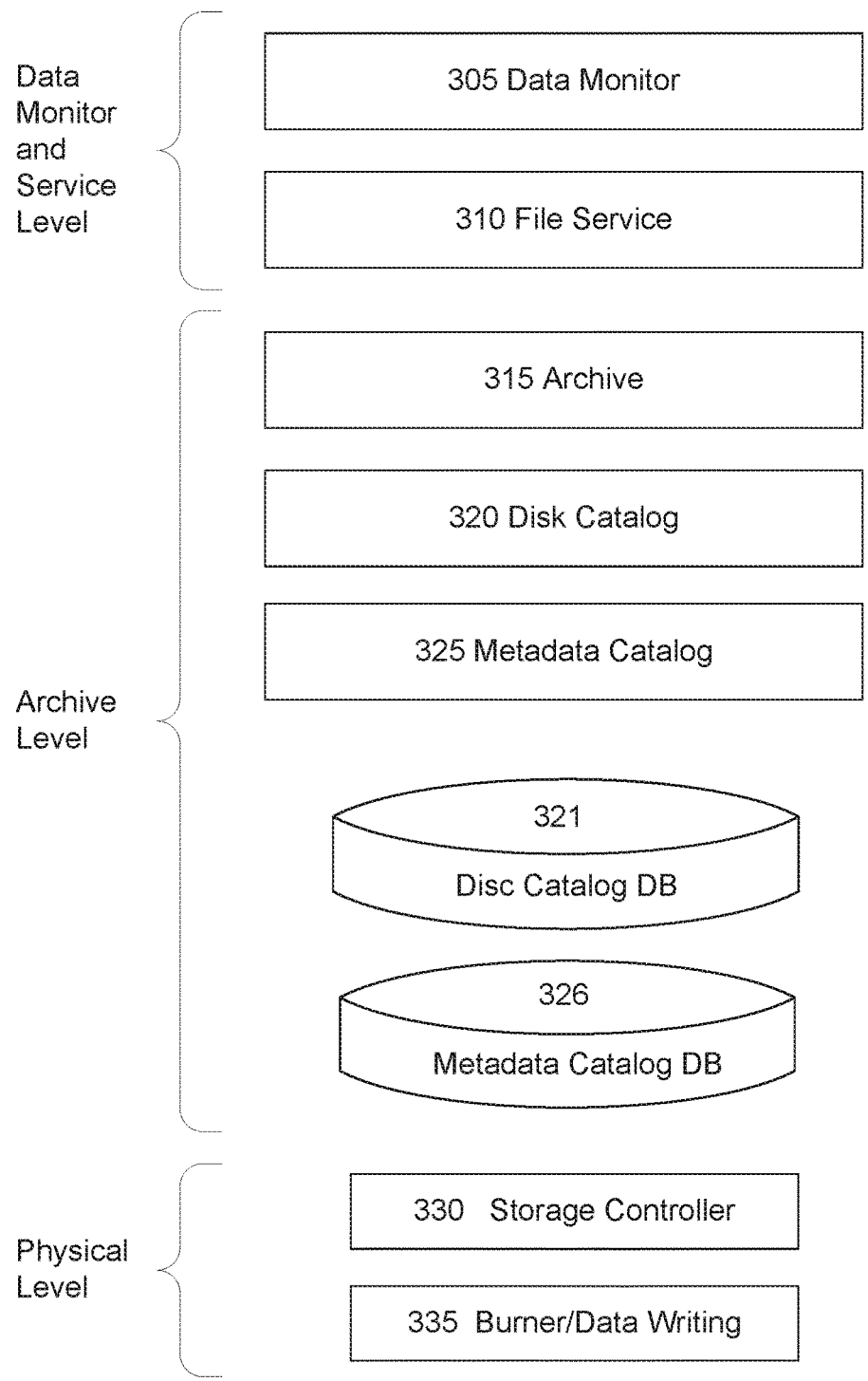
FIG. 3 is a block diagram illustrating components of the control software module for controlling the cold storage mechanism.

FIG. 3 is a block diagram illustrating components of the control software module for controlling the cold storage mechanism. The control software module 300 includes a data monitor module 305 for actively monitoring data in specified locations on optical discs and in specific formats (e.g., files, database tables, etc.). In some embodiments, the data monitor module 305 can includes multiple threads for monitoring different sets of data respectively.

The data monitor module 305 can receive an archiving instruction from the data managing system (e.g., data managing system 130 of data storage system 100) to store a data set in the cold storage space. Upon receiving the archiving instruction, the data monitor module 305 first determines that there is an adequate amount of storage space. For example, if the data monitor module 305 receives an archiving instruction for storing a database table in the cold storage system, the data monitor module 305 determines whether the size of the database table fits a remaining storage space of the volume of a digital optical disc. If not, the data monitor module 305 can assign another empty optical disc for storing the data table. If the size of the database table is larger than an overall storage size of an optical disc, the data monitor module 305 can break the database table into multiple chunks and store the chunks on multiple optical discs.

Most data files stored in the data storage system 100 can be database tables (e.g., Apache Hive tables). The chunks can be either partitions or buckets of the database tables. The database tables include homogeneous units of data which have the same schema. The schema determines what is stored in each column of the data table. A database table can have one or more partition keys that determine how the data is stored. The unique values of the partition keys can be used to divide the database table into multiple partitions such that users can efficiently identify the rows that satisfy a certain criteria. For example, one partition key can be "country" and another partition key can be "year." The user can then identify a partition of the table by specifying the country key being "U.S." and the year key being "2014." The user can run a query only on the relevant partition thereby speeding up the analysis. Similarly, the data storage system 100 can label a relevant partition as legal hold data using the partition keys without affecting the status of the rest of the database table. Alternatively, different partitions of the database table can be stored on different digital optical discs so that a large database table can be divided into partitions and stored on multiple digital optical discs.

In some embodiments, the database table can be divided into buckets, based on values of a hash function of a certain column of the table. For example, a column of the table can be "userid." The data storage system 100 can calculate a hash function of the userid column and divide the database table into multiple buckets based on values of the hash function. The data storage system 100 can label a particular bucket as legal hold data without affecting the status of other buckets of the database table. Alternatively, different buckets of the database table can be stored on different digital optical discs so that a large database table can be divided into buckets and stored on multiple digital optical discs.

The control software module 300 can further include a file service module 310 for handling application directory and file access requests. The file service module 310 can further communicate with the data managing system 130 to confirm whether a file or storage object is also stored in the hot data storage system 110. If the file or storage object is already stored in the hot data system 110, the data managing system 130 directly interacts with the hot data system 110 for accessing the data because it is faster to retrieve data from the hot data system 110. If the file or storage object is not already stored in the hot data system 110, the file service module 310 requests an archive module 315 to access the requested data. The archive module 315 can communicate with a disc catalog module 320 to identify the disc where the request file or storage object is located.

The control software module 300 includes the data monitor module 305 and the file service module 310 at the data monitor and service level. Furthermore, at an archive level, the control software module 300 includes archive module 315, disc catalog module 320, metadata catalog module 325, disc catalog database 321 and metadata catalog database 326. The disc catalog module 320 identifies the disc where the requested data are stored based on the information from the disc catalog database 321, and then the archive module 315 can retrieve the requested data form the identified disc.

The archive module 315 is also responsible for recording the information into the disc catalog database 321 when the corresponding data is burned onto an optical disc, via the disc catalog module 320. The disc catalog module 320 also flags the information in the disc catalog database 321 to indicate that the corresponding data has been burned onto the optical disc as a particular type of data (e.g., legal hold data). The archive module 315 further records metadata (e.g., flag information) into the metadata catalog database 326 via the metadata catalog module 325. The disc catalog module 320 provides mechanisms for storing and accessing data stored in the persistent storage space of the optical discs. In some embodiments, the disc catalog module 320 can further manage metadata about the disc magazines and the files or storage objects on each disc within each magazine.

The metadata catalog database 326 can further store decryption keys as well as legal hold flags. The data has been encrypted before being stored on the optical discs. Any application accessing the data needs to retrieve the corresponding decryption key for decrypting the data. If the decryption key is unique and only stored in the metadata catalog database 326, the metadata catalog module 325 can provide a way to delete the data by removing the deception key form the database. Since the only available decryption key is lost, the encrypted data stored on the optical disc cannot be decrypted and hence is effectively deleted.

The legal hold flag indicates that the corresponding data is being preserved under a legal hold process and cannot be removed. Upon receiving an instruction to remove or modify a data set stored on a digital optical disc, the archive module 315 examines the metadata catalog module 325 to confirm whether there is a legal hold flag corresponding to the data set. If such a legal hold flag exists, the archive module 315 confirms the legal hold policy by refusing to execute the instruction to remove or modify the data set.

The control software module 300 further includes a storage controller 330. The storage controller 330 controls access to and operation of the actual storage mechanisms of the digital optical discs. The storage controller 330 sends instructions to a disc picker mechanism to retrieve an optical disc from one of the disc magazines in order to retrieve data from the optical disc. Data access requests received by the storage controller 330 are queued and processed as they arrive. The storage controller 330 can further include a priority scheme to allow certain data access requests to be processed in a prioritized queue.

The control software module 300 can further include a data writing module 335 (burning module). The data writing module 335 instructs the disc picker mechanism to retrieve an optical disc form one of the disc magazines in order to write data to the optical disc. In some embodiments, the optical disc storage rack can include multiple disc-reading components for reading multiple optical discs simultaneously. The optical disc storage rack can also include multiple disc-writing components for writing (burning) multiple optical discs simultaneously. Furthermore, a disc drive can be implemented as both a disc-reading component as well as a disc-writing component. In some embodiments, the disc-writing component provides a functionality to physically destroy an entire optical disc or a portion of an optical disc. For example, the disc-writing component can apply a laser beam of a high power to physically destroy the data-containing layer (e.g., dye layer) of the optical disc.

The optical discs located within the disc magazines of the optical disc storage rack can be, e.g., Blu-ray discs. In some embodiments, a Blu-ray disc can store up to 200 gigabytes of data (e.g., multi-layer Blu-ray discs). The Blu-ray disc is a cost-effective, removable storage medium for cold storage of large amounts of data that do not need frequent access.

The storage space of each optical disc can have a file system that supports volumes. For example, a Blu-ray disc can use a Universal Disk Format (UDF) as the file system format for the data storage on the Blu-ray disc. The file system can allow each optical disc to include one or more volumes. Each volume acts as a logical container of data being stored (burned) onto the optical disc. For example, volumes of a digital optical disc can store different database tables, or store different partitions or buckets of the same database table.

The UDF file system is well-suited for incremental updates on the optical discs. The UDF file system is written to the optical disc in a single pass. But the UDF file system allows files or storage objects to be created, deleted and changed on the optical discs just like data stored in persistent storage drives (e.g., magnetic hard drives or flash drives). The UDF file system manages the sectors on the digital optical discs. The sectors of the optical discs can be written (or overwritten) at random.

Each file (or storage object) or directory is represented by a file entry in the file system. If the cold storage system is for storing database tables (e.g., Apache Hive tables), each file or storage object can be an entire database table, a partition of a database table, or a bucket of a database table.

The file entry includes metadata for the file, storage object or directory. The file system can use a bitmap to manage the free space of the file system on the optical disc. In some embodiments, the file entry consumes a disc block (e.g., 2 KB on an optical disc). The file entry is indexed by its block address. In some embodiments, a file entry can include legal hold metadata to indicate that the data stored in the corresponding file or storage object is put on legal hold and cannot be removed or modified.

Figure 4:
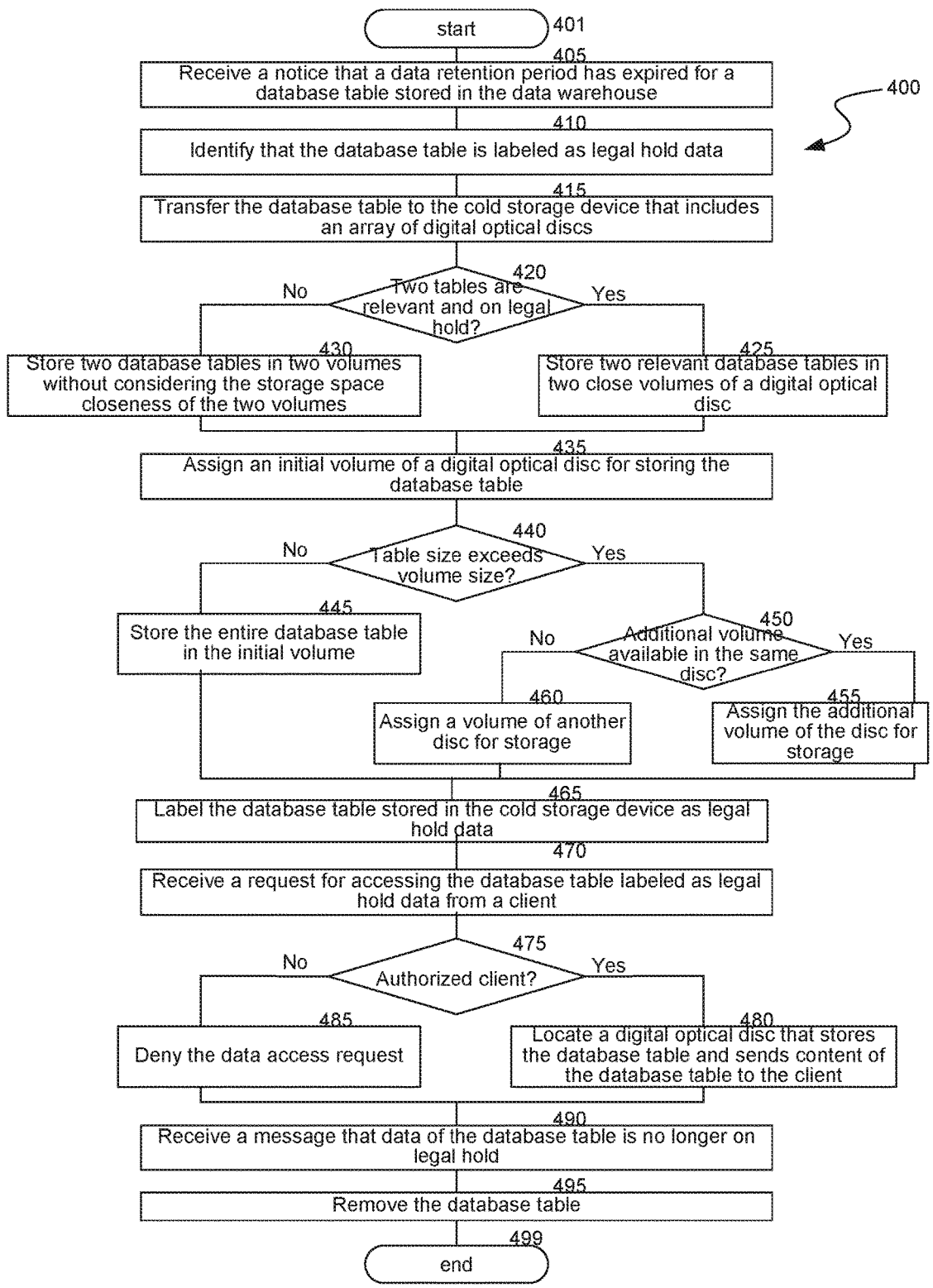
FIG. 4 is a flow diagram illustrating a process of preserving legal hold data using cold storage.

FIG. 4 is a flow diagram illustrating a process 400 of preserving legal hold data using cold storage. A data storage system (also referred to as simply the "system") can include a data warehouse (also referred to as a hot storage system) and a cold storage system. The data warehouse stores multiple database tables that record information of a social media system. The cold storage system includes an array of digital optical discs for storing legal hold data. Each disc can be divided into volumes for storing the database tables. The data warehouse provides faster data access compared to the cold storage system. However, the cold storage system has good data reliability and costs less, and thus is more suitable for preserving legal hold data that needs less frequent data access.

At block 405, the data storage system receives a notice that a data retention period has expired for a database table stored in the data warehouse. In other words, the data warehouse no longer needs to store the database table. However, the data storage system needs to confirm that the database table does not contain any legal hold data before removing the database table from the data warehouse.

At block 410, the data storage system identifies that the database table is labeled as legal hold data. At block 415, the data storage system transfers the database table to the cold storage device that includes an array of digital optical discs, in response to the identification of legal hold data.

At decision block 420, the data storage system determines whether at least some data of the database table are relevant to data of another database table (the relevant database table) and whether both tables are labeled as legal hold data. If so, this means that these two database tables are relevant to each other and will likely be retrieved together under a data access request to the legal hold data. At block 425, the data storage system tries to store these two relevant database tables in two volumes of a digital optical disc that are close to each other on the storage space of the digital optical disc. Since the relevant database tables are stored close to each other on the disc storage space, the cold storage device is able to retrieve relevant data from these two relevant database tables in an efficient way. Otherwise, at block 430, the data storage system just stores these two database tables in two volumes (on the same or separate discs) without considering the storage space closeness of the two volumes.

At block 435, the data storage system assigns an initial volume of a digital optical disc for storing the database table, wherein the digital optical disc is partitioned into one or more volumes. At decision block 440, the data storage system determines whether a size of the database table exceeds a size of the initial volume. If the size of the database table does not exceed the size of the initial volume, at block 445, the system just stores the entire database table in the initial volume. For a large database table, the data storage system will try to fit the database table into volumes of the same digital optical disc. However, if the digital optical disc does not have enough volumes or space to accommodate the entire database table, the system can pick one or more additional volumes from separate discs to store the remaining portion of the database table.

If the size of the database table does exceed the size of the initial volume, at block 450, the system further determines whether there is an additional volume available in the same digital optical disc. If there is an additional volume available in the digital optical disc, at block 455, the system assigns the additional volume of the digital optical disc for storing a remaining portion of the database table. If there is no additional volume available in the same digital optical disc, at block 460, the system assigns a volume of another digital optical disc of the array for storing the remaining portion of the database table.

The database table can be divided in different ways in order to be stored in separate volumes or discs. For example, by specifying values of a partition key (or multiple partition keys), the system can divide rows of the database table into multiple partitions and store the partitions in separate volumes or discs. Alternatively, the system can run a hash function of a particular column of the database table. Based on the values of the hash function, the system can divide the database table into multiple buckets and store the buckets in separate volumes or discs.

In some embodiments, the data storage system can enforce more data storage policies on how to store the database tables in the volumes of the digital optical discs. For example, the data storage system can first try to fill in digital optical discs that are already written with data, before writing data to an empty disc. In other words, within the array, digital optical discs that already store legal hold data have higher priority for receiving and storing new legal hold data, compared to digital optical discs that are empty.

At block 465, the system labels the database table stored in the cold storage device as legal hold data to prevent removal or modification of the database table.

At block 470, the system receives a request for accessing the database table labeled as legal hold data from a client. At decision block 475, the system determines whether the client is authorized to access the legal hold data. The client authorization varies depending on the nature of the legal hold process and the content of the legal hold data. For example, the system can authorize a client to access the legal hold data if the client is an entity within a corporation that controls the legal hold data. The policy can be that if an entity within a corporation (e.g., the legal team) controls the legal hold data, the entity may need to access the legal hold data to evaluate the potential or ongoing litigation. Alternatively, the system can grant access to a client that is an entity that created the legal hold data. The owner and creator of the data has the right to access the data, whether the client is accessing the data due to the litigation or not. The system can also grant access to a client that is an entity involved in an ongoing or potential litigation. For example, if a litigation opponent has been granted a court order to access the legal hold data, the system conforms to the court order by granting access to the litigation opponent.

If the client is authorized, at block 480, the system locates a digital optical disc that stores the database table and sends content of the database table to the client to satisfy the request. Otherwise, at block 485, the system denies the data access request. In some embodiments, the client can be, e.g., a data analyst that requests to retrieve the data for legal analysis purpose. The client's data access request can include an identification of the database table that contains the data. In some embodiments, the client does not need the entire database table and only requests access to a portion of the database table. For example, the data access request can specify the portion by a filter or a value range of a column (e.g., data creation date and/or time) of the database table. The system can locate the digital optical disc that stores the database table and retrieves data from a portion of the database table from the digital optical disc specified by the filter or the column value range. The data retrieved from the digital optical disc can be restored back to a data warehouse (e.g., a hot data storage system) in a format the same as the original format of the original data before the original data was removed from the data warehouse. For example, the data can be restored back to a Hadoop cluster in a format conforming to the Hadoop Distributed File System (HDFS) as if the data had never been removed from the data warehouse (e.g., the Hadoop cluster).

At block 490, the data storage system receives a message that data of the database table is no longer on legal hold. At block 495, the data storage system removes the database table in response to the message. The data of the database table can be destroyed by various ways. For example, the data storage system can destroy an encryption key that was used to encrypt the data of the database table being stored on a digital optical disc. Since the encrypted data on the digital optical disc cannot be decrypted without the encryption key, the data is effectively deleted. Alternatively, the data storage system can corrupt the data of the database table by physically damaging sectors on a digital optical disc that stores the data of the database table.

Figure 5:
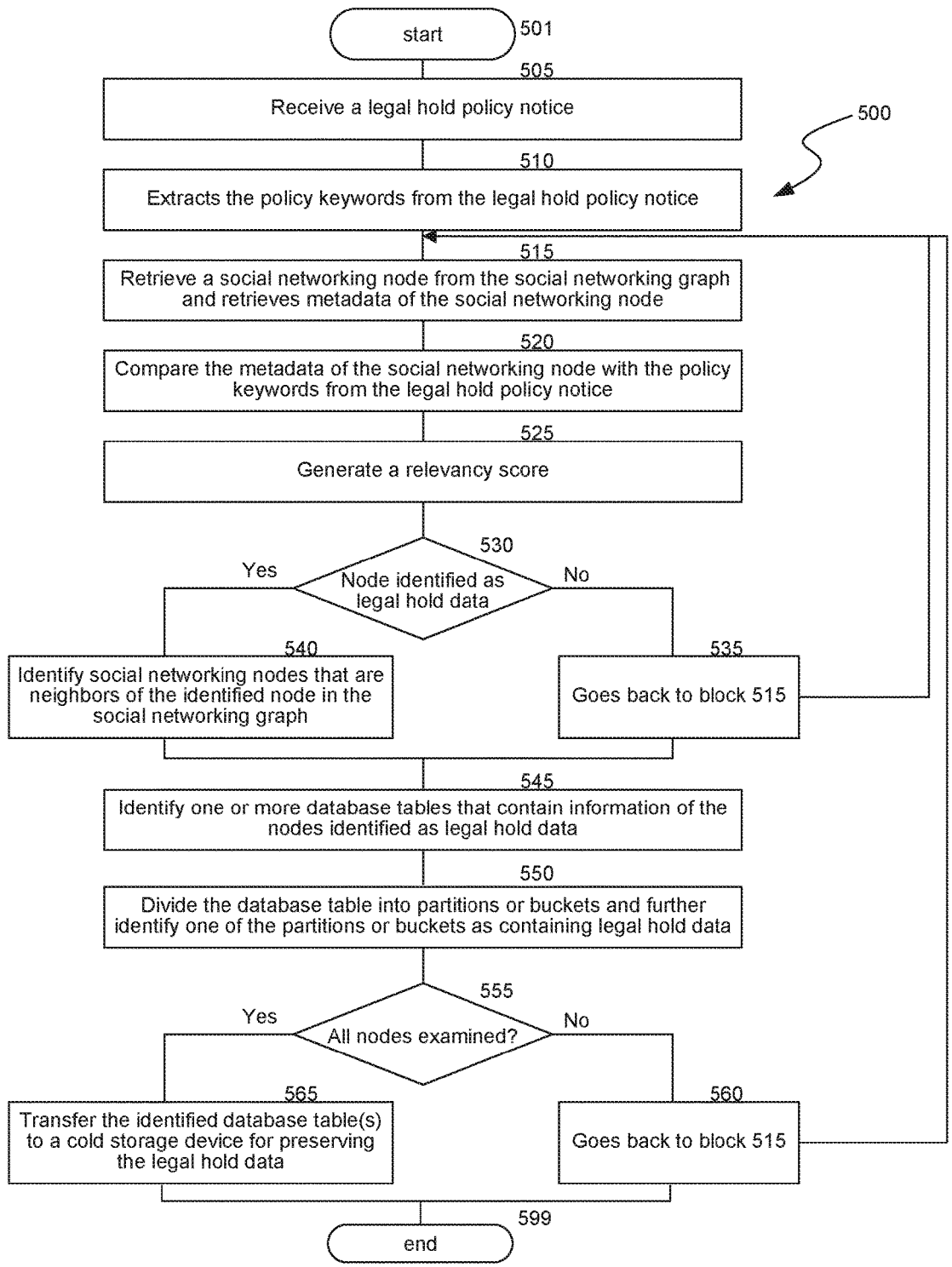
FIG. 5 is a flow diagram illustrating a process of identifying legal hold data for transferring the data to cold storage.

In some embodiments, in order to identify database tables that contain legal hold data and hence need to be stored in the cold storage device, the data storage system needs to examine the social networking graph to determine whether certain data of the social media system is on legal hold. FIG. 5 is a flow diagram illustrating a process 500 of identifying legal hold data for transferring the data to cold storage. At block 505, the data storage system receives a legal hold policy notice. The legal hold policy notice can be initiated by a party that is responsible for handling legal procedures (e.g., an internal legal team of a corporation). The legal hold policy notice includes one or more policy keywords that indicate the topics of matters that are involved in the potential or ongoing litigation and are hence on legal hold.

At block 510, the data storage system extracts the policy keywords from the legal hold policy notice. At block 515, the system retrieves a social networking node from the social networking graph and retrieves metadata of the social networking node. Each social networking node of the social networking graph represents an object of the social networking graph. Such an object can be, e.g., a user of the social media system, a webpage of the social media system, an image uploaded to the social media system, a post or message sent to the social media system, a web link (e.g., URL or universal resource locator) in the social media system, an electronic device connected to the social media system (a mobile phone, a tablet computer, a laptop computer, a desktop computer or a server computer), an advertisement presented in the social media system, or a multiple-media object (e.g., a game or a video). The metadata of the social networking graph can include any information relevant to (or describing the content of) the social networking nodes.

At block 520, the system compares the metadata of the social networking node with the policy keywords from the legal hold policy notice. At block 525, the system generates a relevancy score quantifying a level of relevancy between the social networking node and the legal hold policy notice based on the comparison. At decision block 530, the system determines whether the social network node is identified as part of the legal hold data based on the relevancy score. For example, if the relevancy score exceeds a threshold value, the node can be considered as relevant to the legal hold.

In one embodiment, the legal hold policy notice can include a name of a person. The person can be a party of a potential or ongoing litigation. Thus, the owner of the social media system implements a legal hold process to preserve data relevant to that person. By comparing the person's name with the metadata of the social networking nodes, the system can identify a social networking node that represents a user of the social media system. The user has a name that is the same as the person's name from the legal hold policy notice. The relevancy score is high because of the matched names. Thus, the system determines that data of the social networking node representing the user should be included as part of the legal hold data.

If the social networking node is not identified as legal hold data, at block 535, the system goes back to block 515 to retrieve another social networking node from the social networking graph. If the social networking node is identified as legal hold data, at block 540, the system further identifies social networking nodes that are neighbors of the identified node in the social networking graph.

For example, a user can have uploaded multiple images to the social media system and have posted multiple text messages to friends of the social media system. These images and text messages are represented by social networking nodes that are neighbors to the node that represents the user. Thus, the system not only identifies information about the social media user as legal hold data, but also identifies the information about the posted images and text messages as legal hold data.

At block 545, the system identifies one or more database tables (e.g., Apache Hive tables) that contain information of the nodes identified as legal hold data. In some cases, the legal hold data form only a very small portion of a database table. Therefore, it is inefficient to preserve the entire database table as legal hold data. At block 550, the system divides the database table into partitions or buckets and further identifies one of the partitions or buckets as containing legal hold data.

At decision block 555, the system determines whether all nodes of the social networking graph have been compared with the keywords from the legal hold policy notice. If not all nodes have been examined, at block 560, the system goes back to block 515 to retrieve another social networking node from the social networking graph. Otherwise, the system proceeds to block 565.

At block 565, the system transfers the identified database table(s) (or portion(s) of the table(s)) to a cold storage device for preserving the legal hold data. The legal hold data can be, e.g., preserved in a way illustrated in FIG. 4.

Figure 6:
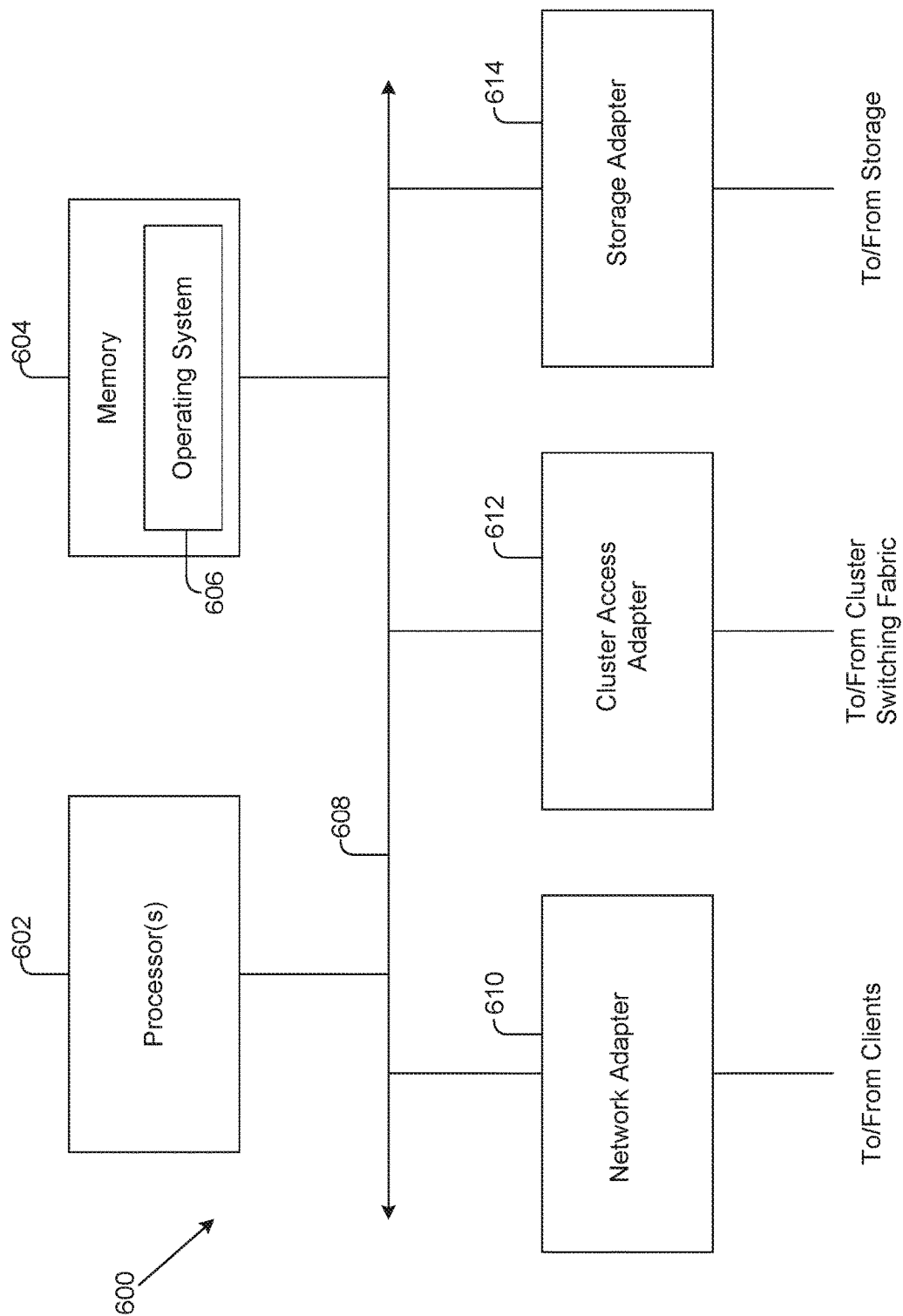
FIG. 6 is a high-level block diagram illustrating an example of a hardware architecture of a computing device that performs disclosed processes, in various embodiments.

FIG. 6 is a high-level block diagram illustrating an example of a hardware architecture of a computing device 600 that performs the above process, consistent with various embodiments. The computing device 600 executes some or all of the processor executable process steps that are described below in detail. In various embodiments, the computing device 600 includes a processor subsystem that includes one or more processors 602. Processor 602 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 600 can further include a memory 604, a network adapter 610, a cluster access adapter 612 and a storage adapter 614, all interconnected by an interconnect 608. Interconnect 608 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 612 includes one or more ports adapted to couple the computing device 600 to other devices. In the illustrated embodiment, Ethernet can be used as the clustering protocol and interconnect media, although other types of protocols and interconnects may be utilized within the cluster architecture described herein.

The computing device 600 can be embodied as a single- or multi-processor system executing an operating system 606 that can implement a high-level module, e.g., a manager, to logically organize the information as a hierarchical structure of named directories, files and special types of files called virtual disks at the storage devices. The computing device 600 can further include graphical processing unit(s) for graphical processing tasks or processing non-graphical tasks in parallel.

The memory 604 can comprise storage locations that are addressable by the processor(s) 602 and adapters 610, 612, and 614 for storing processor executable code and data structures. The processor 602 and adapters 610, 612, and 614 may, in turn, comprise processing elements and/or logic circuitry configured to execute the software code and manipulate the data structures. The operating system 606, portions of which are typically resident in memory and executed by the processor(s) 602, functionally organizes the computing device 600 by (among other things) configuring the processor(s) 602 to invoke. It will be apparent to those skilled in the art that other processing and memory implementations, including various computer readable storage media, may be used for storing and executing program instructions pertaining to the technology.

The network adapter 610 can include multiple ports to couple the computing device 600 to one or more clients over point-to-point links, wide area networks, virtual private networks implemented over a public network (e.g., the Internet) or a shared local area network. The network adapter 610 thus can include the mechanical, electrical and signaling circuitry needed to connect the computing device 600 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 614 can cooperate with the operating system 606 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 614 can include multiple ports having input/output (I/O) interface circuitry that couples to the disks over an I/O interconnect arrangement, e.g., a conventional high-performance, Fibre Channel (FC) link topology. In various embodiments, the cluster access adapter 612 and the storage adapter 614 can be implemented as one adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method comprising:
   receiving, by a data storage system, a legal hold policy notice;
   extracting, by the data storage system, policy keywords from the legal hold policy notice;
   retrieving, by the data storage system, metadata of a social networking node from a social networking graph;
   comparing, by the data storage system, the metadata of the social networking node with the policy keywords from the legal hold policy notice;
   generating, by the data storage system, a relevancy score quantifying a level of relevancy between the social networking node and the legal hold policy notice based on the comparing;
   determining, by the data storage system, whether the social networking node is identified as part of legal hold data based on the relevancy score;
   identifying, by the data storage system, a database table that contains information of the social networking node identified as legal hold data; and
   transferring, by the data storage system, at least a portion of the database table to a cold storage device for preserving the legal hold data.

2. The method of claim 1, wherein the legal hold policy notice was initiated by a party that is responsible for handling legal procedures.

3. The method of claim 1, wherein the policy keywords indicate topics of matters that are involved in a potential or ongoing litigation.

4. The method of claim 1, wherein each social networking node of the social networking graph represents an object of the social networking graph.

5. The method of claim 1, wherein determining, by the data storage system, whether the social networking node is identified as part of the legal hold data based on the relevancy score comprises determining that the social networking node is identified as part of the legal hold data based on a determination that the relevancy score exceeds a threshold value.

6. The method of claim 1, wherein the legal hold policy notice includes a name of a person who is a party of a potential or ongoing litigation.

7. The method of claim 1, further comprising identifying, by the data storage system based on the social networking node being determined as part of the legal hold data, social networking nodes that are neighbors of the social networking node in the social networking graph.

8. The method of claim 1, wherein the legal hold data forms only a small portion of the database table such that it is inefficient to preserve an entirety of the database table as the legal hold data.

9. The method of claim 8, wherein the data storage system divides the database table into partitions or buckets.

10. The method of claim 9, wherein the data storage system further identifies one of the partitions or buckets as containing the legal hold data.

11. A data storage system comprising:
a physical processor:
a memory comprising computer-executable instructions that, when executed by the physical processor, cause the data storage system to perform:
receiving a legal hold policy notice;
extracting policy keywords from the legal hold policy notice;
retrieving metadata of a social networking node from a social networking graph;
comparing the metadata of the social networking node with the policy keywords from the legal hold policy notice;
generating a relevancy score quantifying a level of relevancy between the social networking node and the legal hold policy notice based on the comparing;
determining whether the social networking node is identified as part of legal hold data based on the relevancy score;
identifying a database table that contains information of the social networking node identified as legal hold data; and
transferring at least a portion of the database table to a cold storage device for preserving the legal hold data.

12. The data storage system of claim 11, wherein the legal hold policy notice was initiated by a party that is responsible for handling legal procedures.

13. The data storage system of claim 11, wherein the policy keywords indicate topics of matters that are involved in a potential or ongoing litigation.

14. The data storage system of claim 11, wherein each social networking node of the social networking graph represents an object of the social networking graph.

15. The data storage system of claim 11, wherein determining whether the social networking node is identified as part of the legal hold data based on the relevancy score comprises determining that the social networking node is identified as part of the legal hold data based on a determination that the relevancy score exceeds a threshold value.

16. The data storage system of claim 11, wherein the legal hold policy notice includes a name of a person who is a party of a potential or ongoing litigation.

17. The data storage system of claim 11, wherein the computer executable instructions further cause the data storage system to perform identifying, based on the social networking node being determined as part of the legal hold data, social networking nodes that are neighbors of the social networking node in the social networking graph.

18. The data storage system of claim 11, wherein the legal hold data forms only a small portion of the database table such that it is inefficient to preserve an entirety of the database table as the legal hold data.

19. The data storage system of claim 18, wherein the data storage system divides the database table into partitions or buckets.

20. A non-transitory computer-readable medium comprising computer executable instructions that, when executed by a physical processor of a computing device, cause the computing device to perform:
receiving, by a data storage system, a legal hold policy notice;
extracting, by the data storage system, policy keywords from the legal hold policy notice;
retrieving, by the data storage system, metadata of a social networking node from a social networking graph;
comparing, by the data storage system, the metadata of the social networking node with the policy keywords from the legal hold policy notice;
generating, by the data storage system, a relevancy score quantifying a level of relevancy between the social networking node and the legal hold policy notice based on the comparing;
determining, by the data storage system, whether the social networking node is identified as part of legal hold data based on the relevancy score;
identifying, by the data storage system, a database table that contains information of the social networking node identified as legal hold data; and
transferring, by the data storage system, at least a portion of the database table to a cold storage device for preserving the legal hold data.

* * * * *